Figure 1:
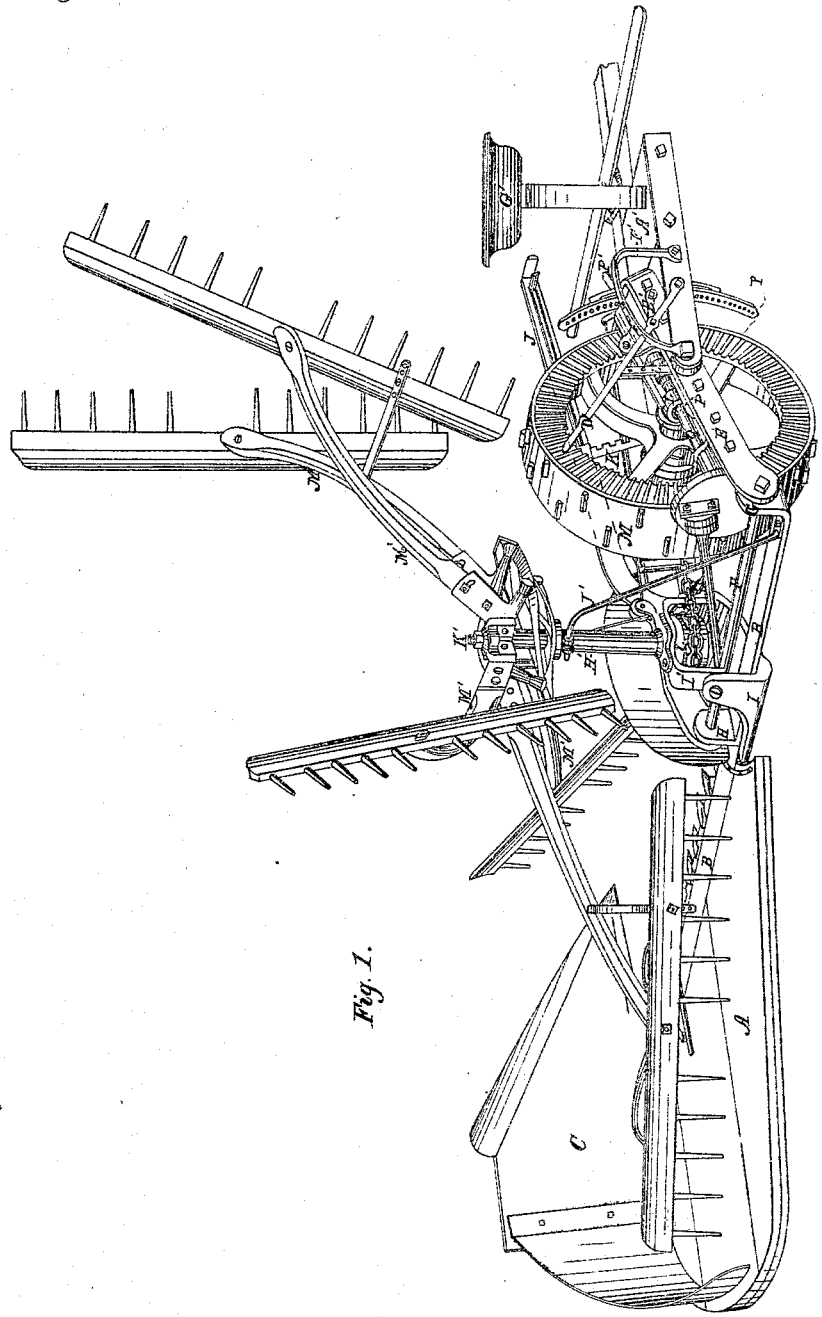

Sheet 2—5 Sheets.
W. N. Whiteley.
Mower.
N° 105,394. Patented Jul. 12, 1870.
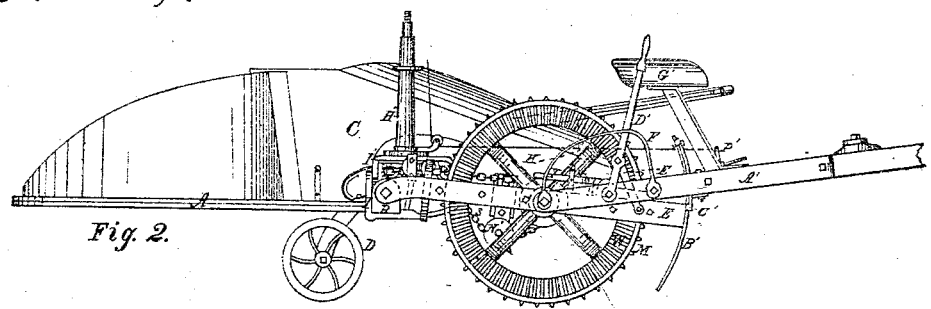
Fig. 2.
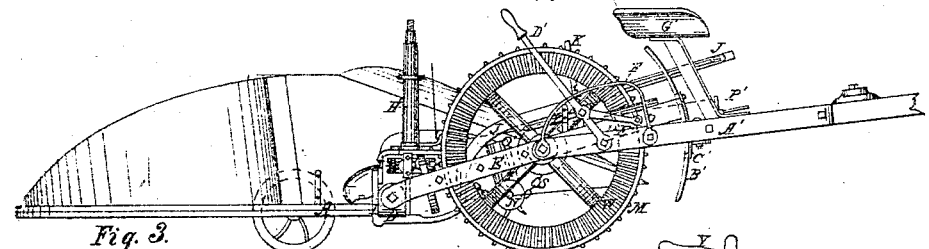
Fig. 3.
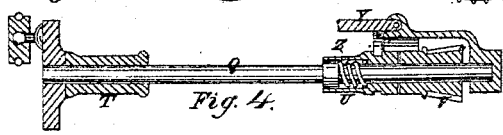
Fig. 4.
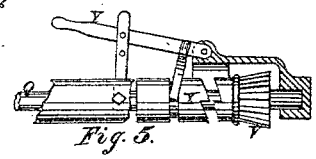
Fig. 5.
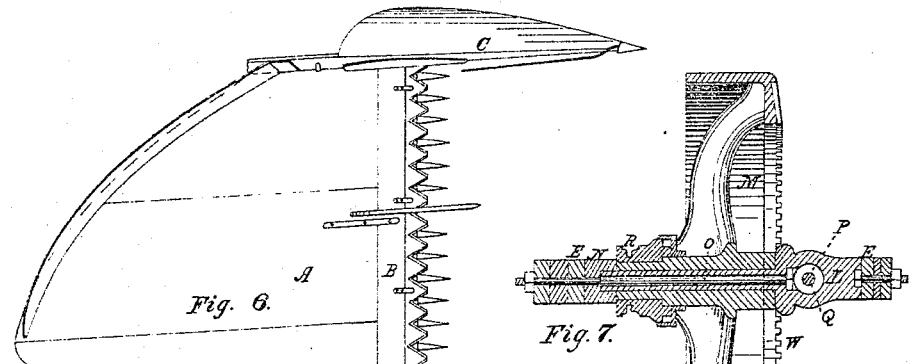
Fig. 6.
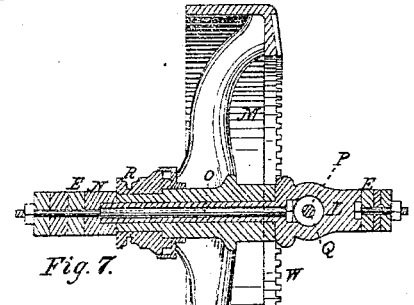
Fig. 7.
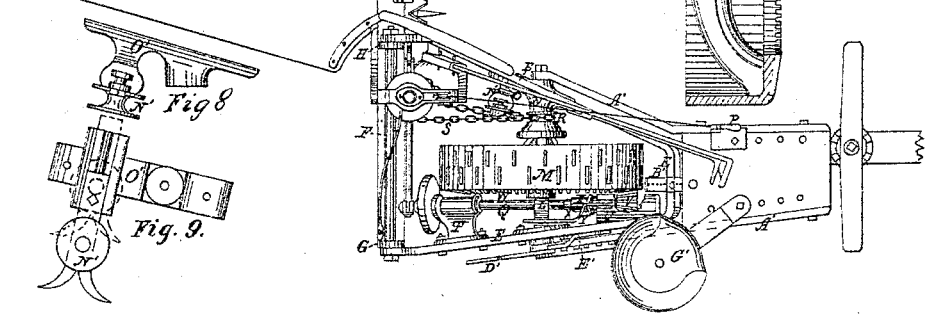
Fig. 8.
Fig. 9.
Witnesses,
E. T. Ellsworth
C. A. Harkness
Inventor,
W. N. Whiteley
By his atty R. D. Smith

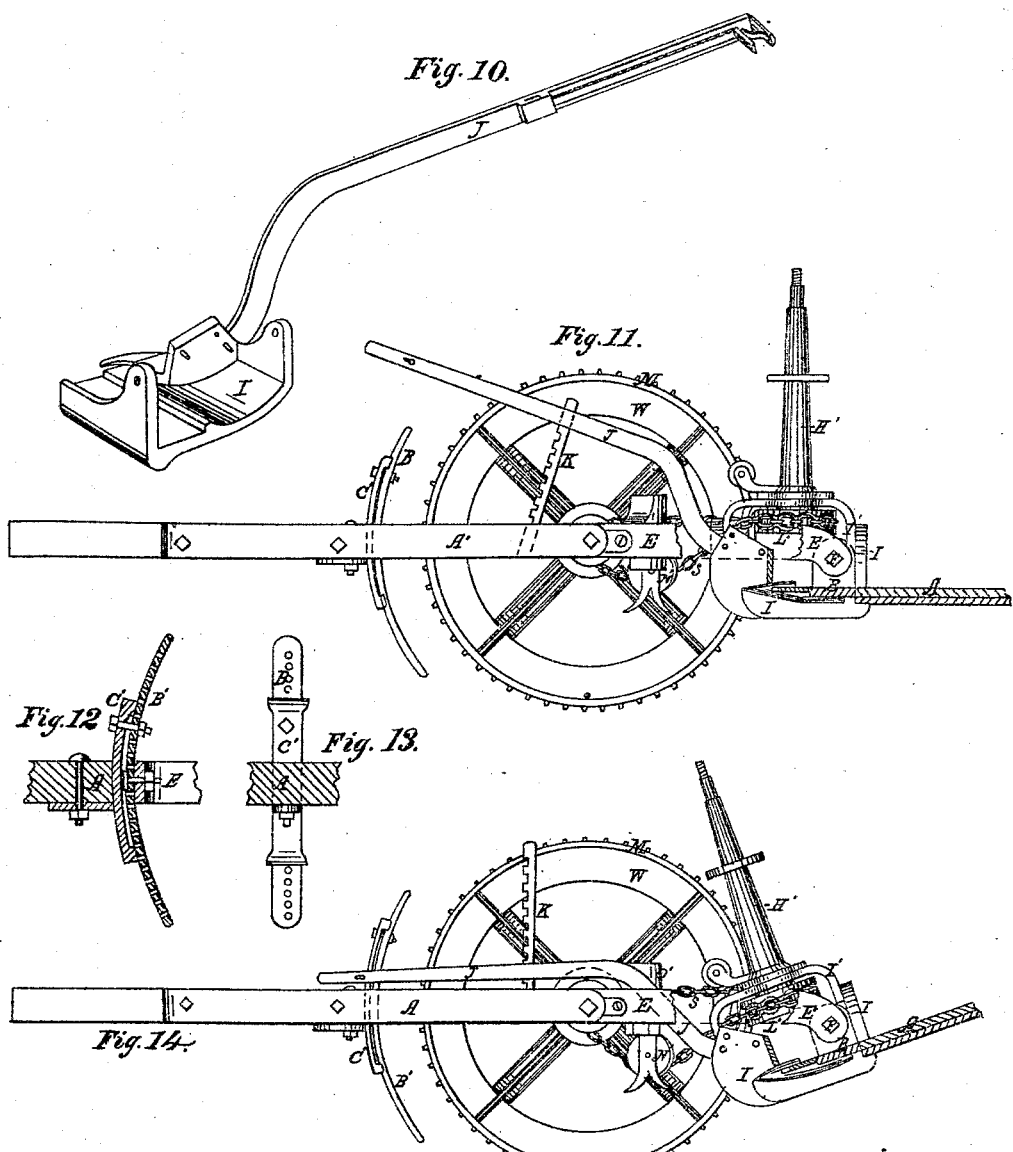

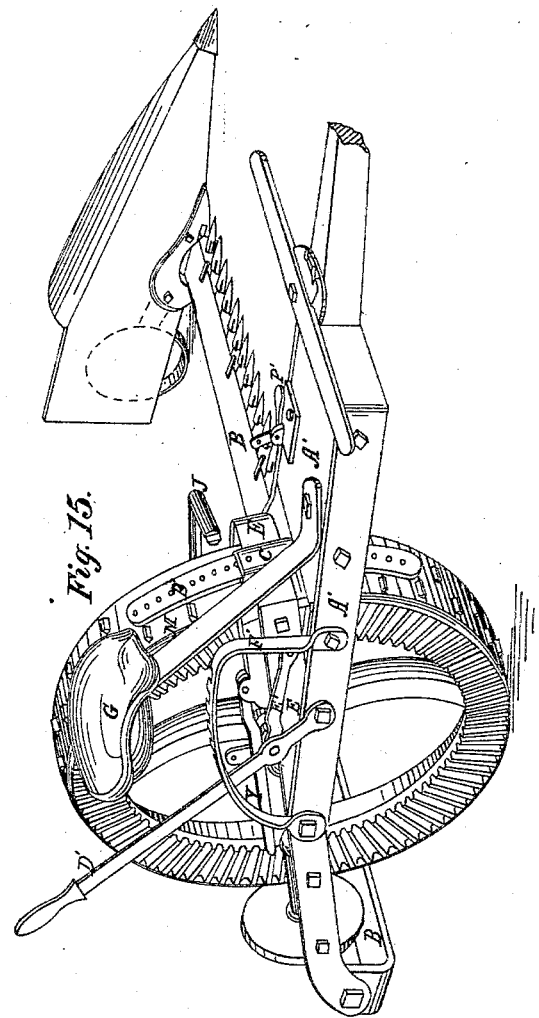

W. N. Whiteley.
Mower.
№ 105,394.    Patented Jul. 12, 1870
Fig. 16.
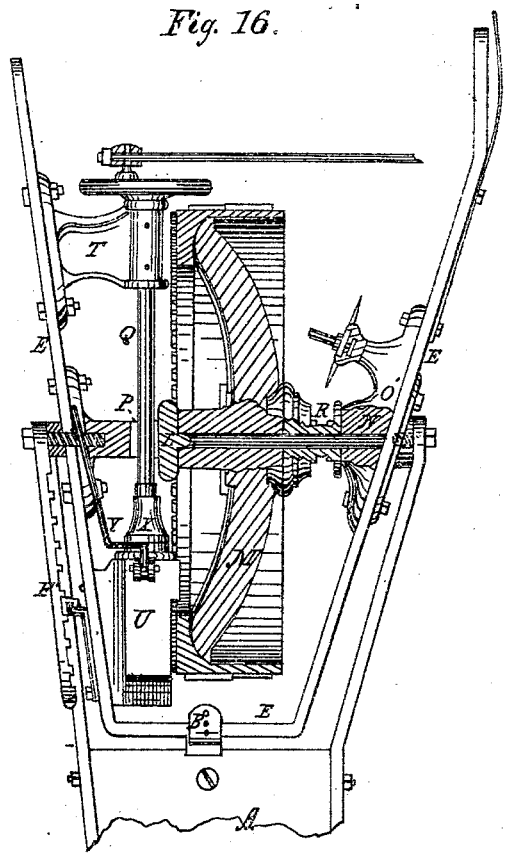
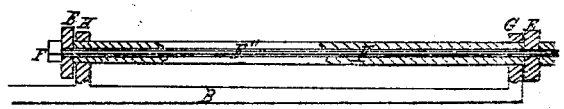
Fig. 17.

UNITED STATES PATENT OFFICE.

WILLIAM N. WHITELEY, OF SPRINGFIELD, OHIO.

IMPROVEMENT IN HARVESTERS.

*Specification forming part of Letters Patent No. 105,394, dated July 12, 1870.*

*To all whom it may concern:*

Be it known that I, WILLIAM N. WHITELEY, of Springfield, in the county of Clark and State of Ohio, have invented a new and useful Improvement in Harvesters; and I do hereby declare the following to be a full, clear, and exact description of the same, reference being had to the accompanying drawings, in which—

Figure 1 is a perspective view of my invention taken from the rear. Fig. 2 is a side elevation of the same, showing the platform elevated. Fig. 3 is a side elevation of the same, showing the platform depressed; Fig. 4, elevation of crank-shaft, with boxes in section; Fig. 5, elevation of crank-shaft, boxes, and coupler; Fig. 6, plan of whole machine; Fig. 7, section of main wheel; Fig. 8, plan of tightening-pulley for reel; Fig. 9, elevation of same; Fig. 10, perspective view of tilting-lever for cutting apparatus; Fig. 11, inner side elevation of machine; Figs. 12 and 13, section and elevation of rack for adjustment of front end of main frame; Fig. 14, inner side elevation, showing operation of tilting-lever; Fig. 15, perspective of machine rigged for mowing; Fig. 16 represents in horizontal section the construction of the main axle. Fig. 17 is a sectional elevation of the joint-rod F, showing the manner of construction.

This is a combined reaping and mowing machine, and belongs to that class known as single-wheel machines.

That others may fully understand its construction and operation, I will particularly describe it.

A is the ordinary quadrant platform, connected to the finger-bar B in the usual manner. At its outer or grain side it is furnished with a divider, C, and an adjustable grain-wheel, D, upon which the outer end of the platform and cutting apparatus is carried.

The main frame of this machine is composed of a single bar of wrought-iron, E, bent, as shown in Fig. 6, in the form of a frustum of a triangle, leaving the base open. This formation secures the greatest strength with a given amount of material. The finger-bar B is prolonged across the rear end of the main frame E, to which it is united by a joint-bolt, F, which passes through the rear ends of the bar E, and through two lugs, G H, formed on the bar B for that purpose. The lug G is formed by bending the end of the finger-bar upward, as shown; and the lug H is formed of a separate piece of angle-iron, bolted fast to the upper surface of the bar.

The finger-bar B, being united to the frame in the manner described, is capable of motion upon a longitudinal axis for the purpose of enabling the points of the fingers and cutters to be depressed by the attendant, as may be required to pass properly beneath lodged or tangled grain. Heretofore when the finger-bar has had a longitudinal axis of motion, said axis has been formed with the inner shoe as one of its parts, and said shoe has therefore been intermediate between the finger-bar and its joint, with liability to become loose at its connection with the finger-bar.

The long joint formed across the entire width of the main frame and connecting the finger-beam directly to the frame secures the greatest strength and stiffness possible to the quantity of material employed, and the use of intermediate parts is avoided.

It is necessary that the longitudinal axis of the finger-bar should be as nearly as possible coincident with the line of the cutters, because it is designed for the purpose of raising or depressing the points or angle of the cutter-plane without materially changing the distance from the ground. It is evident if said axis is placed either in rear or in advance of the cutters, the angle of the cutter-plane will be changed less and the distance from the ground more in proportion as said axis recedes from the line of the cutters. It is practically inconvenient to place said axis actually in the plane of the cutters, and it is therefore placed above it, that being the direction in which the distance from the ground will be least disturbed by a given change of cutter-angle.

The joint-rod F is formed with shoulders at its ends, or with an inclosing sleeve, F″, (see Fig. 17,) by means of which the rear end of the main frame is supported and strengthened laterally, and the said rod is thereby made an integral portion of the frame.

The inner shoe I is bolted securely to the finger-bar B. It supports the rake and reel stand, and a lever, J, is secured to its forward end, and thence projects to a point convenient to the hand of the driver, to enable him to rock the cutting apparatus and elevate or depress the points of the fingers and cutters at will. A latch is attached to the lever J, which, engaging with one of the stops on the standard K, retains the cutting apparatus in the desired position.

The axle L (Fig. 7) of the main driving-wheel is secured to the main frame E at either side about midway of its longitudinal length, and the main driving and supporting wheel M is mounted thereon in the middle of the main frame. The axle L is provided at one end with a flanged head, and said flanges are securely bolted to the main frame, while the other end of said axle rests in a cast step, N, which is bolted to the main frame at the opposite side. The head of the axle L is perforated at P, to admit the passage of the crank-shaft Q across the outer face of the main driving-wheel in a line which will cause the intersection of the axes of said shaft and main axle, and between said wheel and the outer bearing of said axle, so that the shaft Q may be close to the face of the wheel, and a pinion of the smallest diameter may be employed. At the inner side of the main wheel M a sprocket-wheel, R, is mounted upon the axle L, and the chain S passes over said wheel to drive the reel.

The cutters' crank-shaft Q is mounted in boxes T U, which are bolted to the outer part of the main-frame bar E, as shown in Fig. 6. At the front end of the crank-shaft Q is the bevel-pinion V, which meshes with the bevel-driver W, formed on the side of the main wheel M. The pinion V is provided with clutch-teeth, which engage with similar teeth on the clutch-collar X, which moves on a feather back and forth on the crank-shaft Q, and may be moved in or out of connection with it by the clutch-lever Y. A spring, Z, always tends to move it into connection, and thus prevents any accidental disengagement and stoppage of the cutters.

The tongue-frame A' is provided with arms which extend outside of the main frame E back as far as the axis of the wheel M, and said tongue-frame is jointed to the main frame by joint-bolts, the axes of which are coincident with the axis of the axle L, so that, though the main frame may shift its angle to the ground, the elevation of the tongue will not be varied. The curved rack B' is bolted to the front end of the main frame E, and a slide, c, of corresponding curve is bolted to the rear of the tongue-frame. The slide and rack move over each other, and a bolt or pin put through corresponding holes in the two will retain them in any desired relative position. This adjustment is always used when the machine is arranged for reaping, but is not always required when the machine is employed for mowing.

A lever, D', is pivoted to the side of the tongue-frame and is connected to the main frame by a connecting-link, E', so that, by drawing the upper end of said lever forward, the front end of the main frame will be relatively depressed, and a notched rack, F', will retain said lever and main frame in any desired relative position.

The driver's seat G' is mounted upon the tongue-frame A', and may be adjusted thereon by means of a series of bolt-holes along the edge of the tongue-frame, through either one of which the clamp-bolt for the leg of the seat may be passed.

The reel-post H' stands upon the bridge I', and is securely bolted thereto at its foot. The bridge I' is pivoted to the foot and rear lugs of the inner shoe I, and is capable of motion in a vertical plane at right angles to the line of progression. By this means the head of the reel-post may be adjusted in reference to the platform A, so that the teeth of the rake will pass more or less near to its surface, and it is maintained in the desired adjustment by the brace J', which is secured to the finger-beam B at one end, and at the other end it passes through a portion of the reel-post, and is secured thereto by two screw-nuts, which permit the desired adjustment between them. The reel-post H' is hollow, and the reel-shaft K' passes down through it, having suitable bearings at each end, and the sprocket-wheel L' is keyed to the lower end of said shaft. At the top of the reel-shaft is a head provided with lugs, between which the reel-arms M' are pivoted, and at the head of the post H' is a cam-guideway, N', constructed in the usual form and provided with a switch and tail-gate, by means of which either of the reel-blades may be caused to act as a rake to remove the gavels from the platform.

The chain S transmits motion from the pulley R to the wheel L', and thereby drives the rake and reel, and the guide-pulley N' conducts said chain from the wheel L' to the pulley R. To do this more effectually the pulley N' is made adjustable by being mounted upon a slide, which moves in a way made for it in the block O', and may be secured at any point by a set-screw, to give proper tension and lead to the chain S. The sprocket-wheel-and-chain connection with the guide-pulley N' will not permit any interruption of the uniform motion of the reel and rake by reason of any movement of said parts and the finger-bar B upon its longitudinal axis. The chain S will always be equally in gear with the wheel L', whether the rake be thrown forward or backward.

The treadle P', connected by a cord or wire with the cam-switch, enables the driver to trip said switch at any time, to permit one of the rakes to descend upon the platform at irregular intervals, as may be required by the condition of the grain.

When this machine is to be employed as a mower, the platform and raking apparatus are removed, as shown in Fig. 15.

Having described my invention, what I claim as new, is—

1. A harvester main frame, E, of one piece of wrought metal, in the form and manner substantially as shown, so as to surround the main wheel and connect with the cutting apparatus, as described.

2. The axle L, constructed and secured to the main frame E substantially in the manner shown, and for the purpose set forth.

3. A harvester main frame, E, constructed of one piece of wrought metal, substantially in the form shown and described, in connection with the arm A' A' of the tongue-frame, arranged outside of said main frame and jointed thereto at points coincident with the axis of the main driving-wheel, as set forth.

4. The axle L, constructed to permit the long crank-shaft Q to cross the outer side of the wheel M, between said wheel and the outer support of said axle, in a line which will secure the intersection of the axes of said shaft and axle, substantially as set forth.

5. The finger-bar B, extending across the rear end of the main frame and pivoted thereto by means of the long joint-rod F and sleeve F'', substantially in the manner and for the purpose shown.

6. The raking mechanism of a harvester located upon the finger-bar B, pivoted as described, in connection with a rigid controlling-lever, J, whereby the points of the fingers may be depressed, at the will of the attendant, without disturbing the proper relative positions of the cutting apparatus and rake.

WM. N. WHITELEY.

Attest:
   THOS. J. PRINGLE,
   B. F. WRIGHT.